United States Patent
Hoyer

(10) Patent No.: US 9,825,941 B2
(45) Date of Patent: Nov. 21, 2017

(54) METHOD, SYSTEM, AND DEVICE FOR GENERATING, STORING, USING, AND VALIDATING TAGS AND DATA

(71) Applicant: ASSA ABLOY AB, Stockholm (SE)

(72) Inventor: Philip Hoyer, Richmond (GB)

(73) Assignee: ASSA ABLOY AB (SE)

( * ) Notice: Subject to any disclaimer, the term of this patent is extended or adjusted under 35 U.S.C. 154(b) by 0 days.

(21) Appl. No.: 14/772,921

(22) PCT Filed: Mar. 6, 2014

(86) PCT No.: PCT/IB2014/000853
§ 371 (c)(1),
(2) Date: Sep. 4, 2015

(87) PCT Pub. No.: WO2014/140818
PCT Pub. Date: Sep. 18, 2014

(65) Prior Publication Data
US 2016/0021100 A1    Jan. 21, 2016

Related U.S. Application Data

(60) Provisional application No. 61/794,371, filed on Mar. 15, 2013, provisional application No. 61/794,447, filed on Mar. 15, 2013.

(51) Int. Cl.
*H04L 29/06* (2006.01)
*H04L 9/32* (2006.01)
(Continued)

(52) U.S. Cl.
CPC ...... *H04L 63/083* (2013.01); *G06F 17/30887* (2013.01); *H04L 9/321* (2013.01);
(Continued)

(58) Field of Classification Search
CPC ......... H04L 63/0492; H04L 2209/805; H04W 4/008
See application file for complete search history.

(56) References Cited

U.S. PATENT DOCUMENTS 6,961,000 B2   11/2005   Chung
7,295,114 B1   11/2007   Drzaic et al.
(Continued)

FOREIGN PATENT DOCUMENTS

| CN | 102663591 | 9/2012 |
|---|---|---|
| EP | 1710764 | 10/2006 |

(Continued)

OTHER PUBLICATIONS

Fouladgar et al., "A Simple Privacy Protecting Scheme Enabling Delegation and Ownership Transfer for RFID Tags", Nov. 2007, pp. 6-13.*

(Continued)

*Primary Examiner* — Thaddeus Plecha
(74) *Attorney, Agent, or Firm* — Sheridan Ross P.C.

(57) ABSTRACT

A smart tag and methods of interacting with and authenticating interactions with the same are provided. The smart tag (308) is enabled to generate a Tag Authentication Cryptogram (TAC) and include the TAC in a data signature transmitted (S305) to a reading device (304). The data signature can be forwarded by the reading device (304) to an authentication service (340) that will issue a valid signature certificate (S309) if the TAC is determined to be unique and correct. Upon receiving the valid signature certificate, the reading device (304) can validate other data read from the smart tag (308) based on the increased trust relationship between the smart tag (308) and reading device (304).

15 Claims, 6 Drawing Sheets

(51) Int. Cl.

| | | |
|---|---|---|
| *H04W 12/10* | (2009.01) | |
| *H04W 12/06* | (2009.01) | |
| *H04L 29/12* | (2006.01) | |
| *H04W 12/08* | (2009.01) | |
| *G06F 17/30* | (2006.01) | |
| *H04L 29/08* | (2006.01) | |
| *H04W 4/00* | (2009.01) | |

(52) U.S. Cl.
CPC .......... *H04L 9/3247* (2013.01); *H04L 61/609* (2013.01); *H04L 63/0492* (2013.01); *H04L 63/0823* (2013.01); *H04L 67/02* (2013.01); *H04W 12/06* (2013.01); *H04W 12/08* (2013.01); *H04W 12/10* (2013.01); *H04L 63/12* (2013.01); *H04L 2209/805* (2013.01); *H04W 4/008* (2013.01)

(56) References Cited

U.S. PATENT DOCUMENTS

| | | | |
|---|---|---|---|
| 7,942,312 | B2 | 5/2011 | van Ingen |
| 7,965,184 | B1 | 6/2011 | Nichols et al. |
| 8,074,271 | B2 | 12/2011 | Davis et al. |
| 8,285,211 | B2 | 10/2012 | Wang et al. |
| 8,344,853 | B1 | 1/2013 | Warner et al. |
| 8,429,409 | B1 | 4/2013 | Wall et al. |
| 8,880,027 | B1 | 11/2014 | Darringer |
| 9,406,046 | B2 | 8/2016 | Kawaguchi et al. |
| 2004/0093493 | A1 | 5/2004 | Bisbee et al. |
| 2005/0061875 | A1 | 3/2005 | Zai et al. |
| 2006/0230276 | A1 | 10/2006 | Nochta |
| 2006/0277061 | A1 | 12/2006 | Revanur et al. |
| 2007/0052517 | A1* | 3/2007 | Bishop .................. G06Q 20/10 340/5.2 |
| 2007/0106892 | A1 | 5/2007 | Engberg |
| 2008/0069347 | A1 | 3/2008 | Brown et al. |
| 2008/0122584 | A1 | 5/2008 | Itasaki et al. |
| 2009/0055597 | A1 | 2/2009 | Robles |
| 2009/0108063 | A1 | 4/2009 | Jain et al. |
| 2009/0240946 | A1 | 9/2009 | Yeap et al. |
| 2010/0007466 | A1 | 1/2010 | Shoarinejad et al. |
| 2010/0079237 | A1 | 4/2010 | Falk et al. |
| 2010/0299527 | A1 | 11/2010 | Arunan et al. |
| 2011/0025458 | A1 | 2/2011 | Rokhsaz et al. |
| 2011/0074552 | A1 | 3/2011 | Norair et al. |
| 2012/0013448 | A1 | 1/2012 | Baranowski |
| 2012/0159105 | A1 | 6/2012 | Von Behren et al. |
| 2012/0207305 | A1 | 8/2012 | Gallo et al. |
| 2012/0234908 | A1* | 9/2012 | Wang .................. H04L 9/3268 235/375 |
| 2012/0265988 | A1 | 10/2012 | Ehrensvard |
| 2013/0061303 | A1 | 3/2013 | Hart et al. |
| 2013/0102252 | A1 | 4/2013 | Rasmussen et al. |
| 2013/0166917 | A1 | 6/2013 | Granbery |
| 2013/0215467 | A1 | 8/2013 | Fein et al. |
| 2013/0237148 | A1 | 9/2013 | McCann et al. |
| 2013/0254116 | A1* | 9/2013 | Hayhow .............. G06Q 20/3829 705/71 |
| 2013/0344808 | A1 | 12/2013 | Murray et al. |
| 2014/0013406 | A1* | 1/2014 | Tremlet .................. G06F 21/32 726/5 |
| 2014/0023195 | A1 | 1/2014 | Lee et al. |
| 2014/0075572 | A1 | 3/2014 | Mehring et al. |
| 2014/0118113 | A1 | 5/2014 | Kaushik et al. |
| 2014/0123056 | A1* | 5/2014 | Puranik .................. G06F 3/048 715/780 |
| 2014/0173708 | A1 | 6/2014 | Garlick |
| 2014/0282974 | A1 | 9/2014 | Maher et al. |
| 2014/0357187 | A1 | 12/2014 | Ehrensvard |
| 2015/0208245 | A1 | 7/2015 | Robinton et al. |
| 2015/0363599 | A1 | 12/2015 | Hoyer et al. |
| 2016/0012696 | A1 | 1/2016 | Robinton et al. |
| 2016/0021091 | A1 | 1/2016 | Hoyer et al. |
| 2017/0118201 | A1 | 4/2017 | Hoyer et al. |

FOREIGN PATENT DOCUMENTS

| | | |
|---|---|---|
| EP | 2487629 | 8/2012 |
| EP | 2518657 | 10/2012 |
| WO | WO 2008/028291 | 3/2008 |
| WO | WO 2011/089423 | 7/2011 |
| WO | WO 2012/103584 | 8/2012 |
| WO | WO 2013/034681 | 3/2013 |
| WO | WO 2013/072437 | 5/2013 |

OTHER PUBLICATIONS

U.S. Appl. No. 14/772,011, filed Sep. 1, 2015, Hoyer et al.
U.S. Appl. No. 14/897,708, filed Dec. 11, 2015, Hoyer et al.
"EMV—Integrated Circuit Card Specifications for Payment Systems. Book 2: Security and Key Management," EMVCo, LLC, Jun. 2008, Version 4.2, 177 pages [retrieved from: http://www.iro.umontreal.ca/~salvail/securite/notes2010/EMVv4.2Book2.pdf].
"EPC Radio-Frequency Identity Protocols Generation-2 UHF RFID Specification for RFID Air Interface, Protocol for Communications at 860MHz-960MHz, Version 2.0.0 Ratified," GS1 EPCglobal Inc., Nov. 1, 2013, pp. 1-152 [retrieved from: http://www.gs1.org/sites/default/files/docs/uhfc1g2/uhfc1g2_2_0_0_standard_20131101.pdf].
"NFC Signature Record Type Definition (RTD) Technical Specification," NFC Forum, Nov. 18, 2010, 18 pages [retrieved from: http://members.nfc-forum.org/specs/spec_license].
"Oberthur Technologies partners with HID Global to carry Seos digital keys on NFC SIM cards for mobile access," ASSA ABLOY, Jul. 17, 2013, 1 page [retrieved from: http://www.assaabloy.com/en/com/press-news/news/2013/oberthur-technologies/].
Emms et al. "The Dangers of Verify PIN on Contactless Cards," Computing Science, Technical Report Series, No. CS-TR-1332, May 2012, 14 pages [retrieved from: http://www.cs.ncl.ac.uk/publications/trs/papers/1332.pdf].
Falk et al. "Application of Passive Asymmetric RFID Tags in a High-Assurance Avionics Multi-Domain RFID Processing System," RFID Systems and Technologies (RFID SysTech), 2008 4th European Workshop, Jun. 11, 2008 8 pages [retrieved from: http://ieeexplore.ieee.org/stamp/stamp.jsp?arnumber=05755752].
Kilas et al. "Digital Signatures on NFC Tags Master of Science Thesis," Mar. 18, 2009, 53 Pages [retrieved from: http://web.it.kth.se/~johanmon/theses/kilas.pdf].
Leicher et al. "Smart OpenID: A Smart Card Based OpenID Protocol," IFIP Advances in Information and Communication Technology, 2012, vol. 376, pp. 75-86.
Pearson "Securing the Pharmaceutical Supply Chain with RFID and Public-key infrastructure (PKI) Technologies," Texas Instruments, Jun. 2005, White Paper, 12 pages.
Piramuthu "Lightweight Cryptographic Authentication in Passive RFID-Tagged Systems," IEEE Transactions on Systems, Man, and Cybernetics: Part C: Applications and Reviews, May 2008, vol. 38, No. 3, pp. 360-376.
Saeed et al. "Off-line NFC Tag Authenticiation," The 7th International Conference for Internet Technology and Secured Transactions, 2012 International Conference for IEEE, Dec. 10, 2012, pp. 730-735.
Saros et al. "A Platform for Pervasiv Infrastructures," Next Generation Mobile Applications, Services and Technologies, 2009, NGMAST '09, Third International Conference on IEEE, Piscataway, NR, USA, Sep. 15, 2009, pp. 83-88.
Tan et al. "A Robust and Secure RFID-Based Pedigree System (Short Paper)," Information and Communications Security Lecture Notes in Computer Science, Jan. 2006, pp. 21-29.
Vassilev et al. "Personal Brokerage of Web Service Access," Security & Privacy, Sep. 2007, vol. 5, No. 5, pp. 24-31.
International Search Report and Written Opinion for International (PCT) Patent Application No. PCT/IB2013/002617, dated Feb. 19, 2014 12 pages.
International Preliminary Report on Patentability for International (PCT) Patent Application No. PCT/IB2013/002617, dated Mar. 19, 2015 8 pages.

(56) References Cited

OTHER PUBLICATIONS

International Search Report and Written Opinion for International (PCT) Patent Application No. PCT/IB2013/001949, dated Feb. 25, 2014 15 pages.
International Preliminary Report on Patentability for International (PCT) Patent Application No. PCT/IB2013/001949, dated Jan. 14, 2016 10 pages.
International Search Report and Written Opinion for International (PCT) Patent Application No. PCT/IB2014/001558, dated Nov. 12, 2014 11 pages.
International Preliminary Report on Patentability for International (PCT) Patent Application No. PCT/IB2014/001558, dated Sep. 24, 2015 7 pages.
International Search Report and Written Opinion for International (PCT) Patent Application No. PCT/IB2014/000853, dated Sep. 17, 2014 15 pages.
International Preliminary Report on Patentability for International (PCT) Patent Application No. PCT/IB2014/000853, dated Sep. 24, 2015 10 pages.
International Search Report and Written Opinion for International (PCT) Patent Application No. PCT/IB2014/000812, dated Sep. 18, 2014 13 pages.
International Preliminary Report on Patentability for International (PCT) Patent Application No. PCT/IB2014/000812, dated Sep. 24, 2015 8 pages.
International Search Report and Written Opinion for International (PCT) Patent Application No. PCT/IB2014/000843, dated Sep. 12, 2014 13 pages.
International Preliminary Report on Patentability for International (PCT) Patent Application No. PCT/IB2014/000843, dated Sep. 24, 2015 8 pages.
International Search Report and Written Opinion for International (PCT) Patent Application No. PCT/IB2014/002157, dated Feb. 17, 2015 12 pages.
International Search Report and Written Opinion for International (PCT) Patent Application No. PCT/IB2014/002986, dated Jun. 30, 2015 19 pages.
Official Action for U.S. Appl. No. 14/306,078, dated Jul. 2, 2015 11 pages.
Tan et al., "A Robust and Secure RFID-Based Pedigree System (Short Paper)," Information & Communications Security Lecture Notes in Computer Science; LNCS, Springer, Berlin, Jan. 1, 2006, pp. 21-29.
Official Action for European Patent Application No. 14758165.6, dated Dec. 8, 2016, 9 pages.
Official Action for Australian Patent Application No. 2014229568, dated Feb. 8, 2017, 3 pages.
Official Action for Australian Patent Application No. 2014229575, dated Feb. 7, 2017, 3 pages.
International Preliminary Report on Patentability for International (PCT) Patent Application No. PCT/IB2014/002157, dated Dec. 29, 2016 8 pages.
International Preliminary Report on Patentability for International (PCT) Patent Application No. PCT/IB2014/002986, dated Jan. 26, 2017 14 pages.
Official Action for U.S. Appl. No. 14/426,180, dated Apr. 15, 2016 19 pages.
Official Action for U.S. Appl. No. 14/426,180, dated Sep. 8, 2016 30 pages.
Notice of Allowance for U.S. Appl. No. 14/426,180, dated Feb. 6, 2017 10 pages.
Official Action for U.S. Appl. No. 14/897,708, dated Jan. 9, 2017 16 pages.
Official Action for U.S. Appl. No. 14/772,894, dated Aug. 8, 2016 13 pages.
Official Action for U.S. Appl. No. 14/772,011, dated Feb. 10, 2017 8 pages Restriction Requirement.
Official Action for U.S. Appl. No. 14/772,011, dated May 8, 2017 13 pages.
Official Action for U.S. Appl. No. 14/772,995, dated Sep. 22, 2016 13 pages.
Official Action for U.S. Appl. No. 14/306,078, dated Mar. 1, 2016 11 pages.
Official Action for U.S. Appl. No. 14/306,078, dated Oct. 12, 2016 14 pages.
Notice of Allowance for U.S. Appl. No. 14/306,078, dated Mar. 13, 2017 6 pages.
Staake et al., "Extending the EPC Network—The Potential of RFID in Anti-Counterfeiting," Symposium on Applied Computing, 2005, pp. 1607-1612.
Notice of Allowance for U.S. Appl. No. 14/772,894, dated Feb. 16, 2017 7 pages.
Final Action for U.S. Appl. No. 14/772,995, dated Jun. 8, 2017 15 pages.

\* cited by examiner

METHOD, SYSTEM, AND DEVICE FOR GENERATING, STORING, USING, AND VALIDATING TAGS AND DATA

CROSS REFERENCE TO RELATED APPLICATION

This application is a national stage application under 35 U.S.C. 371 of PCT Application No. PCT/IB2014/000853 having an international filing date of Mar. 6, 2014, which designated the United States, which PCT application claimed the benefit of U.S. Application Ser. Nos. 61/794,371 and 61/794,447, both filed Mar. 15, 2013, each of which are incorporated by reference in their entirety.

FIELD OF THE DISCLOSURE

The present disclosure is generally directed toward proximity-based Radio Frequency (RF) devices and methods of interacting with the same.

BACKGROUND

RF Identification (RFID) is currently the dominating technology in physical access control systems. Four standards currently dominate RFID communication: ISO/IEC 14443-A, ISO/IEC 14443-B, ISO/IEC 15693, and JIS X6319-4, each of which are hereby incorporated herein by reference in their entirety. Most access control systems installed over the last decade support one or more of these standards, or can be upgraded to support one or more of these standards. Consequently, there is a huge legacy of installed access control readers that use these standards on global basis.

The same RFID standards are used for other applications such as transport, luggage identification, ticketing, payment according to the Contactless EMV standard (Europay, MasterCard, Visa), and more.

Due to the wide spread implementation of these RFID standards, the Near-Field Communications (NFC) technology that is developed for use in mobile devices, such as smart phones and tablet devices, builds upon the same RFID standards. One could say that NFC is RFID embedded in a phone, instead of a RFID embedded in to a card, key fob, sticker or even a card reader embedded in a phone.

The NFC hardware can either be an integral part of the mobile device or phone or it can be removable (e.g., a removable NFC chip or device). NFC devices can typically operate in any one of three modes, where the first two modes are most commonly used: (1) card emulation mode; (2) read/write mode; and (3) peer-to-peer mode.

As expected, NFC tags have proliferated along with the adoption of NFC technologies in mobile devices. Most NFC tags contain data that is read by NFC-capable devices. Tags that use other communication protocols (e.g., non-NFC protocols such as Bluetooth, ZigBee, etc.) have also experienced significant development in parallel with the development of NFC tags.

The assurance that a tag is genuine and the data on the tag has not been tampered with is critical in certain tag-based solutions, regardless of the communication protocol used by the tag. To add security to the data stored on an NFC tag, the NFC forum describes a security standard that consists of a static signature of the data. The corresponding certificate identifying the signing party can then either be present on the tag itself or be de-referenced using a certificate URL. The reading device if it reads a certificate URL and complies with the NFC forum standard will then fetch the certificate from the URL before validating the signature using the certificate. This static signature augments the security of the original data, but has limitations in that the data ands its signature can be copied from one tag to another and still result in a successful validation. In other words, the static signature does not protect the data against replay attacks.

SUMMARY

It is, therefore, one aspect of the present disclosure to provide a smart tag with the ability to respond uniquely to discrete read requests issued by a reading device. More specifically, embodiments of the present disclosure propose a smart tag that has the ability to respond to a read request by: generating a Tag Authentication Cryptogram (TAC) that is substantially unique to the read request; appending the TAC to certificate-retrieval data (e.g., a Certificate Universal Resource Locator (URL)) to create a unique Certificate URL; generating a signature based on the TAC or a combination of the TAC and some other data (e.g., the Certificate URL); and providing tag data, the signature, and/or the unique Certificate URL back to the reading device. The reading device can then request a signature certificate using the unique Certificate URL received from the tag data. Assuming the unique Certificate URL is, in fact unique, the reading device will receive a valid certificate that can be used by the reading device to validate the signature received from the smart tag. In other words, the reading device can validate tag data based on the signature and/or the unique Certificate URL.

It is another aspect of the present disclosure to provide an authentication service with the ability to authenticate interactions between a smart tag and reading device. More specifically, the authentication service is capable of receiving a request for a signature certificate from a reading device. The request for a signature certificate may include a Certificate URL retrieved from a smart tag by a reading device. The authentication service may analyze the Certificate URL received from the reading device to determine if the Certificate URL corresponds to a unique Certificate URL. In particular, the authentication service may determine that the Certificate URL corresponds to a unique Certificate URL if the Certificate URL has a valid TAC contained therein. The authentication service may further determine that the TAC is valid and properly associated with a known and valid Tag Unique Identifier (TAGID). This analysis performed by the authentication service may include using a cryptographic key K and a counter value C to validate the TAC contained in the Certificate URL. In this way, the authentication service can determine that the reader received a valid and unique Certificate URL from a specific smart tag and the Certificate URL provided from the smart tag to the reading device is not a replay of some previous Certificate URL generated by the smart tag.

If the authentication service determines that the Certificate URL is a unique Certificate URL, then the authentication service may generate and provide a valid signature Certificate back to the reading device. The valid signature Certificate provided back to the reading device may correspond to a short-lived certificate where the certificate expires after a predetermined short amount of time. Alternatively or additionally, the authentication service may return a newly generated valid signature Certificate. This utilization of a short-lived certificate can make the entire validation chain specific to a short period of time, thereby reducing the threats against replay attacks or improper use of the certificate. In the case of failed validation of the TAC, the authentication service can return either an expired or incorrect Certificate (e.g., a Certificate containing an incorrect key) that would make the reading device's validation of the signature value received from the smart tag fail. The above-described method utilizes the certificate retrieval protocol between the reading device and the authentication service to validate the smart tag data via the data signature at the moment of certificate retrieval.

In one embodiment, a method of authenticating a smart tag is provided that generally comprises:

receiving, at an authentication service, a request for a signature certificate, where the request for the signature certificate includes a TAC and optional TAGID generated by the smart tag during an interaction between the smart tag and a reading device;

analyzing the TAC to determine whether the TAC is unique and generated by a known and valid smart tag;

based on the analysis of the TAC, determining that the TAC is unique and generated by a known and valid smart tag;

in response to determining that the TAC is unique and generated by a known and valid smart tag, generating a valid signature certificate; and transmitting the valid signature certificate to the reading device.

In some embodiments, the TAC is generated by the smart tag with a pseudo-random number generator.

In some embodiments, the authentication service receives the TAGID and TAC via a Short Message Service (SMS) message, a Multi-Media Message Service (MMS) message, an email message, or the like. This may allow the reading device to transmit the TAGID and TAC to the authentication service directly.

In some embodiments, a smart tag may be configured to generate a TAC in response to any number of conditions or triggers. As one example, the smart tag may generate a TAC in response to a reading device coming into a predetermined proximity (e.g., a read range) of the smart tag. In this particular configuration, the smart tag may automatically generate a TAC every time that a reading device is within a distance suitable to establish a bidirectional communication link with the smart tag. Thus, a new TAC may be automatically generated by the smart tag in response to detecting a reading device within its communication range, regardless of whether or not the reading device requests information from the smart tag. This means that a certain number of TACs generated by the smart tag may never be transmitted to a reading device; instead, the smart tag will increment or move on to the next TAC when another (or the same reading device) reading device is later into read range of the smart tag. As another example, the smart tag may be triggered to generate a TAC only in response to receiving a request for authentication from the reading device. In this configuration, the smart tag may wait to generate a TAC unless and until a reading device is within a read range of the smart tag and the reading device requests that the smart tag authenticate itself to the reading device. After the request for authentication is received from the reading device, the smart tag may generate and transmit a data object containing a TAC to the reading device. This particular configuration does not result in the superfluous generation of TACs as compared to the first example described above.

In some embodiments, the TAC may be appended to a Certificate URL to create a unique Certificate URL. The unique Certificate URL may be included in the request for a signature certificate. In other words, the Certificate URL may enable a reading device to communicate with the appropriate authentication service.

In some embodiments, the valid signature certificate may be used by the reading device to validate a signature value received from the smart tag during the same interaction in which the unique Certificate URL was received from the smart tag. In other words, the reading device may use the valid signature certificate to validate the tag at the moment the valid signature certificate is received from the authentication service.

It is still another aspect of the present disclosure to provide a method of responding to a read request from a reading device, the method comprising:

receiving, at a smart tag, a read request from a reading device;

in response to receiving the read request, generating, at the smart tag, a data object that includes tag data and response-specific data, the response-specific data including a signature value and a unique Certificate URL; and transmitting the data object from the smart tag to the reading device via a proximity-based Radio Frequency (RF) protocol.

In some embodiments, the unique Certificate URL comprises a substantially unique TAC incorporated therein. The unique Certificate URL may further include a TAGID assigned to the smart tag. The reading device may then utilize the signature value and the unique Certificate URL to validate the tag data.

In some embodiments, the unique Certificate URL is generated using a changeable data part corresponding to a counter that increments after every read event registered by the smart tag. In some embodiments, the changeable data part comprises a pseudo randomly-generated number.

In some embodiments, a cryptographic key and changeable data part are stored in a secure element of the smart tag (e.g., a secure execution environment) and used to generate the unique Certificate URL.

In some embodiments, the data object is transmitted to the reading device as an NFC Data Exchange Format (NDEF) message.

In some embodiments, the tag data may include at least one of a phone number and email address. In other embodiments, the tag data, the TAGID, and the TAC are incorporated into a Universal Resource Locator (URL) and are separated by a delimiter (e.g. a slash '/').

In some embodiments, the proximity-based RF protocol may include an NFC protocol, Ultra-High Frequency (UHF) protocols, High Frequency (HF) protocols, a variation of Bluetooth (e.g., Bluetooth, Bluetooth 4, Bluetooth Low Energy (LE) or BLE, or any standard yet to be developed).

The present disclosure will be further understood from the drawings and the following detailed description. Although this description sets forth specific details, it is understood that certain embodiments of the invention may be practiced without these specific details.

DETAILED DESCRIPTION

Embodiments of the present disclosure will be described in connection with a smart tag, a system for interacting with a smart tag, and authenticating responses generated by a smart tag. While most of the discussions herein refer to a "smart tag" as being the vehicle that provides the responses to a reading device, it should be appreciated that embodiments of the present disclosure are not so limited. Indeed, any type of device having a processor and memory capable of performing the functions of the smart tag discussed herein can be utilized without departing from the scope of the present disclosure. For instance, any tag form factor may be used. Examples of such form factors include card-type tags, key fobs, wristbands, smart tags embedded in clothing or other objects, smart watches, stickers, smart phones, laptops, tablets, etc.

Figure 1A:
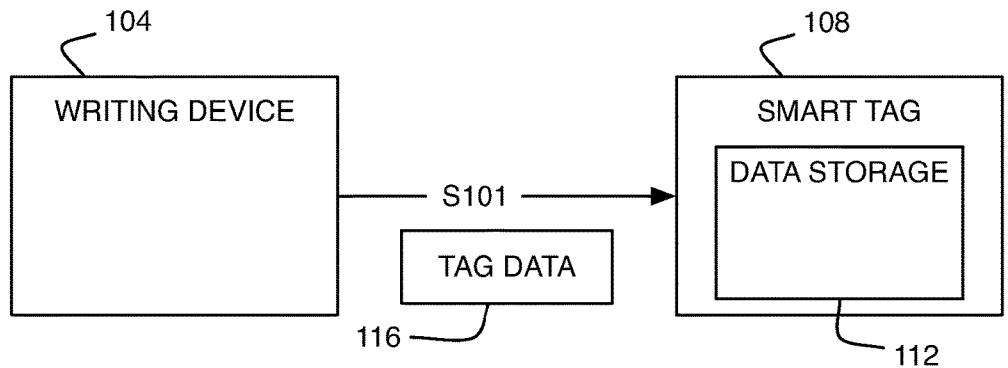
FIG. 1A is a block diagram depicting a first state of a smart tag having tag data written thereto in accordance with embodiments of the present disclosure.
Figure 1B:
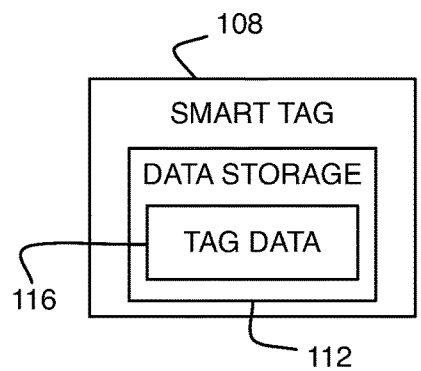
FIG. 1B is a block diagram depicting a second state of a smart tag having tag data written thereto in accordance with embodiments of the present disclosure.
Figure 1C:
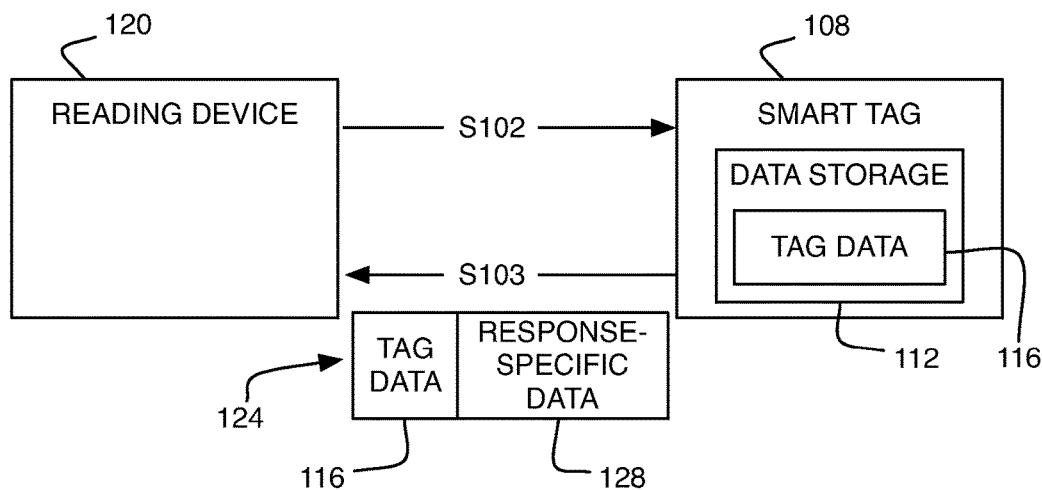
FIG. 1C is a block diagram depicting a smart tag responding to a read request from a reading device in accordance with embodiments of the present disclosure.

With reference initially to FIGS. 1A-1C, a process for writing tag data 116 to a smart tag 108 and then reading the tag data 116 therefrom will be described in accordance with embodiments of the present disclosure. The process begins with a first step of writing the tag data 116 to the smart tag 108 as shown in FIG. 1A. More specifically, a writing device 104 may be used to establish a communication channel with the smart tag 108. In some embodiments, the communication channel established between the writing device 104 and smart tag 108 may correspond to a RF inductive coupling between antennas of each device. The inductive coupling between the writing device 104 and smart tag 108 may depend upon a relative proximity of the two devices. Thus, the communication channel may correspond to a wireless communication channel such as an NFC channel. Other wireless and RF-based proximity protocols such as Bluetooth, WiFi (e.g., IEEE 802.11N), and the like may also be used to establish a communication channel between the writing device 104 and smart tag 108. The channel may be established directly between the two devices or it may be established indirectly (e.g., by passing through a wireless router, server, and/or the like). In other embodiments, the communication channel may be wired (e.g., via a Universal Serial Bus (USB) wire, Ethernet wire, etc.).

In some embodiments, the writing device 104 may correspond to any type of electro-mechanical device capable of interacting with the smart tag 108. Regardless of whether the communication channel is a wired or wireless channel, the process begin with the writing device 104 writing the tag data 116 to the smart tag 108 (step S101). The tag data 116 may be written to the smart tag 108 by use of a write command or equivalent Application Protocol Data Unit (APDU) that is retrieved from memory of the writing device 104 when the communication channel is established between the writing device 104 and smart tag 108.

Upon receiving the tag data 116, the smart tag 108 may store the tag data 116 in a local data storage location 112, as is shown in FIG. 1B. In some embodiments, the data storage 112 may correspond to volatile or non-volatile memory. Even more specifically, the data storage 112 may correspond to a secure memory location of an Integrated Circuit (IC). In such an embodiment, the smart tag 108 may correspond to an Integrated Circuit Card (ICC).

After the tag data 112 has been stored in the data storage 112, the smart tag 108 is capable of providing the tag data 116 back to a reading device 120 upon receiving a read request as shown in FIG. 1C. More specifically, a reading device 120 may issue a read request to the smart tag 108 (step S102) via a communication channel established between the reading device 120 and smart tag 108. The communication channel established between the reading device 120 and smart tag 108 may be a wired or wireless communication channel. In some embodiments, the nature of the communication channel used by the reading device 120 may be similar to the communication channel used by the writing device 104. In some embodiments, the reading device 120 may correspond to the same or a similar type of device as the writing device 104, but operating in a reading mode instead of a writing mode. Alternatively, the reading device 120 may be a different type of device as compared to the writing device 104. As an example, the reading device 120 may correspond to hand-held reader, a mobile communication device (e.g., smart phone, tablet, laptop, Personal Digital Assistant (PDA), smart watch, remote control, smart vehicle or car, etc.), or the like. In some embodiments, the reading device 120 may communicate with the smart tag 108 using RF inductive coupling (e.g., at frequencies of 125 kHz, 13.56 MHz, etc.). Other protocols such as Bluetooth and/or WiFi may also be used to facilitate communications between the reading device 120 and smart tag 108.

When the smart tag 108 receives the read request from the reading device 120, the smart tag 108 may generate a data object 124 and provide the data object 124 back to the reading device 120 as a response to the read request (step S103). The nature of the data object 124 may depend upon the nature and structure of the tag data 116. Furthermore, although FIG. 1C shows that the data object 124 includes the entirety of the tag data 116, it should be appreciated that less than all of the tag data 116 may be included in the data object 124 and still be considered tag data.

Regarding the nature of the tag data 116, the format of the data object 124 may vary depending upon the environment in which the smart tag 108 is being used. Illustrative examples of tag data 116 may include a URL, email address, phone number, or combinations thereof. Moreover, the tag data 116 may include instructions to be executed by the reading device 120 upon receiving the tag data 116. As an example, the tag data 116 may include relatively simple instructions that cause the reading device 120 to insert other parts of the tag data 116 (e.g., the URL, email address, phone number, etc.) into a particular message or message type. As such, the tag data 116 may include multiple portions, some of which may be used by the reading device 120 and others of which may be executed by the reading device 120.

As will be discussed in further detail herein, the data object 124 may further include response-specific data 128. The response-specific data 128 may correspond to a portion of data that changes in each response or data object 124 prepared by the smart tag 108 when the smart tag 108 is operating properly. In some embodiments, the tag data 116 may correspond to a URL, email address, phone number or the like and the response-specific data 128 may correspond to a signature used to validate the tag data 116. As a more specific example, the response-specific data 128 may comprise a signature that includes a signature value generated by the smart tag 108 as well as a certificate URL. The certificate URL may also be uniquely generated by the smart tag 108 in response to the read request. The reading device 120 may then utilize the certificate URL to request a signature certificate from an authentication service and eventually validate the tag data 116.

In some embodiments, the data object 124 may be generated and sent by the smart tag 108 as one or more NDEF messages (which may have one or more NDEF records) or individual NDEF records. More specifically, the data object 124 may be structured in accordance with the NFC standards described herein above and incorporated herein by reference. The tag data 116 may correspond to a first record (e.g., Record 1) in the data object 124 and the response-specific data 128 may correspond to a second record (e.g., Record 2) in the data object 124. As mentioned above, it may also be possible to create a single record that incorporates both the tag data 116 and response-specific data 128 into a single record with one or more delimiters separating the two pieces of data within the record. Each record in the data object 124 may comprise a header and payload, where the payload comprises the tag data 116 and/or response-specific data 128 and the header includes an identifier, length, and type to describe the payload. Thus, where both the tag data 116 and response-specific data 128 are incorporated into a single NDEF record, the payload of the single NDEF record may both data pieces and the header may describe information about both data pieces. Even where the tag data 116 includes an email address or phone number, the data object 124 may be formatted as a Universal Resource Indicator (URI).

Upon reading the data object 124 from the smart tag 108, the reading device 120 may be configured to perform one or many functions in response to reading the data object 124. As will be discussed in further detail herein, the reading device 120 may initiate a process of requesting a signature certificate, based on information contained in the response-specific data 128. The signature certificate that is eventually received back at the reading device 120 may be used by the reading device 120 to validate (or invalidate) the tag data 116.

Figure 2:
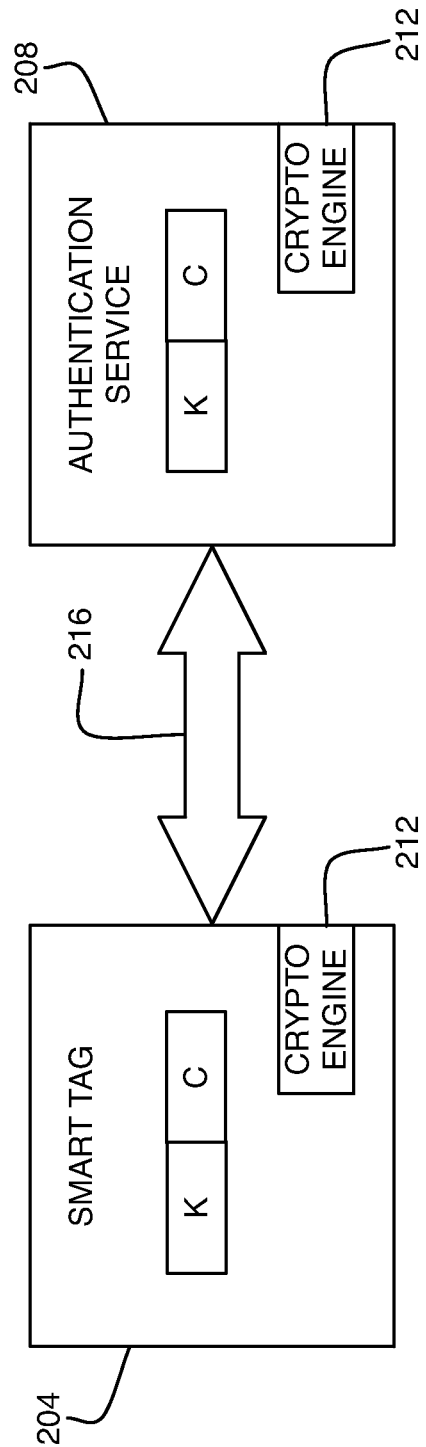
FIG. 2 is a block diagram depicting a tag manufacturing and personalization process in accordance with embodiments of the present disclosure.

Because validation of the tag data 116 may be predicated upon receiving a valid signature certificate, it is important that an authentication service providing such signature certificates operate in harmony with valid smart tags. Accordingly, with reference now to FIG. 2, the specific operations of a smart tag 204 (which may be similar or identical to smart tag 108) and authentication service 208 will be described in accordance with embodiments of the present disclosure. Again, the smart tag 204 may be in any format such as: card-type tags, key fobs, wristbands, smart tags embedded in clothing or other objects, smart watches, stickers, smart phones, laptops, tablets, or combinations thereof.

The authentication service 208 may correspond to a server or collection of servers capable of analyzing data generated by the smart tag 204 and then, based on said analysis, generate signature certificates that can be used by other devices, such as reading devices, to validate data received from a smart tag 204. Accordingly, there may be a communication pathway 216 between the smart tag 204 and the authentication service 208. It should be noted, however, that the communication pathway 216 may traverse one or more other devices, such as reading device 120, communication servers, web servers, email servers, etc.

The smart tag 204 is shown to include a symmetric key K that is unique to a particular smart tag 204 among a population of smart tags. In other words, the symmetric key K may not be shared with any other smart tag 204. The authentication service 208 may also have knowledge of the symmetric key K assigned to the smart tag 204.

The smart tag 204 may also comprise a counter value C that is provisioned to the smart tag 204 and, again, also known to the authentication service 208. In some embodiments, the counter value C may include a potential random initial value that is calculated at the time of provisioning the smart tag 204. Each time the smart tag 204 responds to a read request issued by a reading device, the counter value C may increment or otherwise change to a new value that is not repetitive of any counter value previously used by the smart tag 204. In this way, the smart tag 204 will be configured to use a new and unique counter value C for each response to a read request.

The smart tag 204 and authentication service 208 are also shown to include a crypto engine 212 that is configured to compute of a TAC. On the smart tag 204, the crypto engine 212 may utilize the symmetric key K and current value of the counter value C to generate a new TAC for every read request. In some embodiments, the crypto engine 212 may generate a new TAC every time a new reading device is detected within a read range of the smart tag 204, regardless of whether or not a read request has been received by the smart tag 204. The crypto engine 212 of the authentication service 208 may operate in synchronization with the crypto engine 212 of the smart tag 204, thereby enabling the authentication service 208 to generate a new TAC every time it determines that the smart tag 204 has generated a new TAC (e.g., by determining that the smart tag 204 has responded to a read request by virtue of a reading device informing the authentication service 208 of a new read request). In some embodiments, the crypto engine 212 may compute a TAC via a cryptographic means, such as HMAC-SHA-1, as described in RFC 4226. Thus, a TAC may be generated as: TAC=truncated HMAC_SHA1 (K,C). As long as the crypto engines 212 and counter values C at the smart tag 204 and authentication service 208 are in synchronization, the authentication service 208 will be able to properly analyze TAC generated at the smart tag 204.

Figure 3:
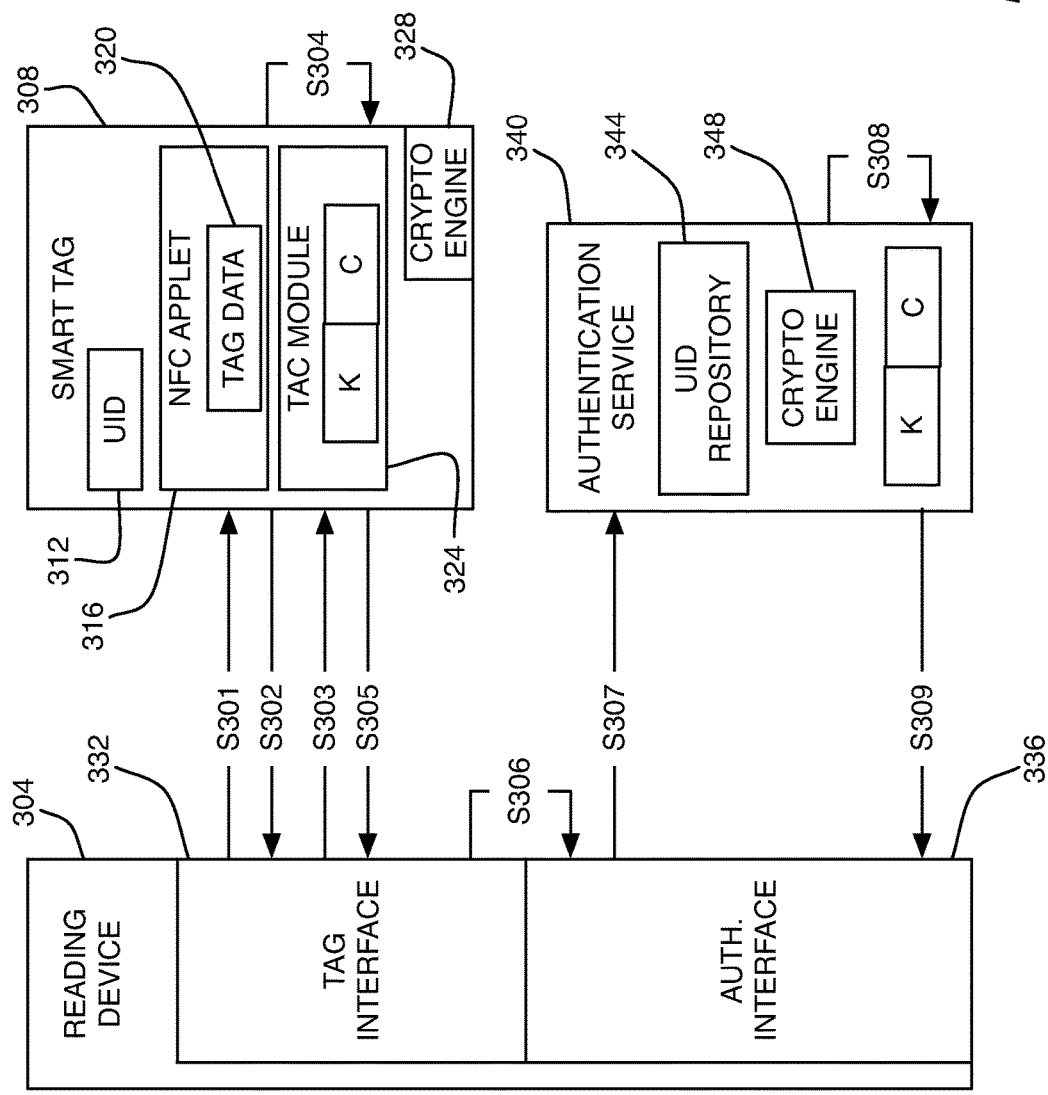
FIG. 3 is a block diagram depicting an authentication process in accordance with embodiments of the present disclosure.

With reference now to FIG. 3, a method of authenticating a smart tag 308 will be described in accordance with embodiments of the present disclosure. The smart tag 308 may be similar or identical to the previously-discussed smart tags 108, 204.

The authentication method begins when a reading device 304 issues a read request to a smart tag 308 (step S301). The reading device 304 may be similar or identical to the reading device 120. In one embodiment, the reading device 304 may issue a request to read only a TAGID 312 of the smart tag 308. The smart tag 308 may respond to the initial read request by providing its TAGID 312 back to the reading device 304 (step S302). The communications between the reading device 304 and smart tag 308 may be carried out via a tag interface 332 of the reading device 304. The nature of the tag interface 332 may depend upon the protocol used by the smart tag 308. As an example, the tag interface 332 may correspond to an NFC interface, a Bluetooth interface, a WiFi interface, or the like.

Upon receiving the TAGID 312 of the smart tag 308, the reading device 304 may analyze the received TAGID 312 to ensure that the TAGID 312 is in an expected format and otherwise conforms to TAGIDs issued by trusted smart tags 308. If the TAGID 312 cannot be authenticated in this simple analysis, the reading device 304 may discontinue the authentication process. If the TAGID 312 appears to be valid or at least in a trusted format, the process may continue with the reading device 304 issuing a second request to read tag data from the smart tag 308 (step S303). It should be appreciated, however, that the reading device 304 may send a single request asking the smart tag 308 to respond with tag data 320 and a TAGID 312.

Upon receiving the request for tag data 320, the smart tag 308 may invoke an NFC applet 316, which subsequently invokes a TAC module 324 that is also resident on the smart tag 308 (step S304). The NFC applet 316 may correspond to an application or portion of executable code that enables the smart tag 308 to emulate functionality of an NFC tag, perhaps in accordance with ISO 7816, the entire contents of which are hereby incorporated herein by reference. The TAC module 324 may correspond to code contained within the smart tag 308 (and possibly written thereto during provisioning) that is capable of generating unique responses to read requests on behalf of the smart tag 308. In some embodiments, the TAC module 324 may comprise the unique cryptographic key K and a counter value C and the TAC module 324 may utilize the cryptographic key K and counter value C along with the assistance of the cryptographic engine 328 (which may be similar or identical to crypto engine 212) to create a data object 124 that can be provided back to the reading device 304 in step S305.

More specifically, the cryptographic key K may correspond to a symmetric encryption key of length N bytes that is substantially unique to the smart tag 308 on which it is written. In some embodiments, the cryptographic key K may include a seed value written to the smart tag 308 during provisioning. Likewise, the counter value C may also correspond to a random initial value assigned to the smart tag 308 during provisioning or any incremented value obtained as the smart tag 308 generates responses to devices. In other words, the counter value C may change according to use of the smart tag 308 such that the counter value C is never the same value twice during the life of the smart tag 308; thereby ensuring that the smart tag 308 continues to generate substantially unique responses to each read request. Thus, the seed value may correspond to the combination of the cryptographic key K and the counter value C initially written to the smart tag 308 during provisioning. This process essentially defines what TAC or pseudo-random number that is generated by the smart tag 308.

The cryptographic engine 328 is designed to compute a TAC, once invoked by the TAC module 324, based on inputs K and C provided by the TAC module 324. Even more specifically, when the TAC module 324 is invoked by the NFC applet 316, the TAC module 324 may provide the cryptographic key K and the current counter value C (or pseudo-randomly-generated number) to the cryptographic engine 328 which utilizes a cryptographic mechanism that is a hash function that takes an arbitrary block of data (e.g., K and C) and returns a fixed-size bit string, the cryptographic hash value, such that any (accidental or intentional) change to the data will (with very high probability) change the output hash value. Non-limiting examples of cryptographic mechanisms that may be used as the cryptographic engine 328 include MD5, SHA-1, SHA-2, SHA-3, SHA-256, keyed-hash message authentication codes (HMACs), or any other 128, 256, or 512-bit encryption algorithm. The cryptographic engine 328 returns a value based on the inputs K and C that is provided to the NFC applet 316.

Upon receiving the results from the cryptographic engine 328, the NFC applet 316 formats a response for the reading device 304 that includes the tag data 320 as well as the results received from the cryptographic engine 328 (e.g., the TAC) and optionally a unique TagID. The NFC applet 316 then prepares the data object 124 to be provided to the reading device 304 in step S305. More particularly, the data object 124 may include tag data 320 and response-specific data 128. The tag data 320 can be in any known format used by smart tags to respond to read requests (e.g., URLs, email addresses, phone numbers, executable instructions, etc.). The response-specific data 128 included in the response of S305 may include a data signature having both a signature value and a unique certificate URL. As a non-limiting example, the message transmitted back to the reading device 304 may be formatted for transmission via NFC, Bluetooth, or some other proximity-based RF communication protocol. Even more specifically, the message transmitted back to the reading device 304 in step S303 may comprise one or more NDEF records having the tag data 320 and the response-specific data 128. As a specific non-limiting example, the response-specific data may be formatted as a URL according to the following:

URL=StaticURL+/+TAGID+/+TAC

Where the StaticURL may correspond to the tag data 320 (e.g., a URL written to the smart tag 308 during provisioning), the TAGID may correspond to the TAGID 312 of the smart tag 308 (e.g., an identifier that is specific to the smart tag 308) or a unique TagID issued to the tag at issuance, and the TAC may correspond to the TAC that is unique to the current interaction between the smart tag 308 and reading device 304. More specifically, the unique certificate URL can be used by the reading device 304 to request a valid signature certificate from the authentication service 340 and eventually validate the tag data 320.

Accordingly, the process continues with the reading device 304 passing at least some information obtained from the smart tag 308 to its authentication service interface 336 (step S306). Because the response in step S305 was signed by the smart tag 308, the reading device 304 continues the process of authentication by requesting a signature certificate that can be used to validate the signature and the tag data.

In some embodiments, the authentication interface 336 may correspond to a web browser or the like that enables the reading device 304 to communicate with the authentication service 340 over a communication network, such as the Internet. The authentication service interface 336 is used to issue a request for a signature certificate (step S307). This request may include the unique Certificate URL received at the reading device in step S305. Thus, the unique Certificate URL may include the URL portion that enables the reading device 304 to navigate its browser toward the authentication service 340 as well as the TAGID 312 and/or TAC generated by the smart tag 308.

The authentication service 340 then begins the process of analyzing the TAGID 312 and/or TAC generated by the smart tag 308 and received via the reading device 304 (step S308). This analysis may include the authentication service 340 executing its version of the crypto engine 340 with the symmetric key K and counter value C to validate the TAC for the TAGID 312. If the authentication service 340 is able to confirm that the TAC generated by the smart tag 308 is unique (e.g., by utilizing its crypto engine 348, symmetric key K, and counter value C) and properly associated with a valid TAGID 312 (e.g., by referencing an internal TAGID repository 344), the authentication service 340 may then issue a valid signature certificate to the reading device (step S309). On the other hand, if the TAC is not validated in step S308, then the authentication service 340 may fail to issue any signature certificate or the authentication service 340 may issue an invalid or expired signature certificate that does not enable the reading device to validate the signature value and, therefore, the response-specific data 128 portion of the data object 124. Moreover, failure to receive a valid signature certificate at the reading device 304 may cause the reading device 304 to fail validating the tag data 116 and the smart tag 308 as a whole.

It should be appreciated that where the counter value C is incremented at the TAC module 324, the counter value C at the authentication service 340 is incremented for each response it receives. Thus, the counter values C at each device should maintain a certain amount of synchronization. Alternatively, where a pseudo-random number generator is used by the smart tag 308, TAC can be based on a pseudo-randomly generated number or a true random number. It should be appreciated that the authentication service 340 may be allowed to verify the validity of a TAC without necessarily generating its own TAC. Instead, the authentication service 344 may maintain a listing of previously-received TACs. This list may be kept indefinitely or it may comprise only a fixed number of TACs from previous interactions (e.g., the last 200 TACs). If the authentication service 340 receives a TAC that it has previously received (e.g., that is already found in the list of previously-received TACs), then the authentication service 340 may identify the TAC as invalid.

As shown above, the authentication service 340 basically operates as a certificate authority. If unique read events are detected between a valid smart tag 308 and reading device 304, the authentication service 340 will issue a certificate to the reading device 304 enabling the reading device 304 to authenticate the smart tag 308. It should be appreciated that the certificate provided back to the reading device 304 in step S309 may be in any known certificate format.

Figure 4:
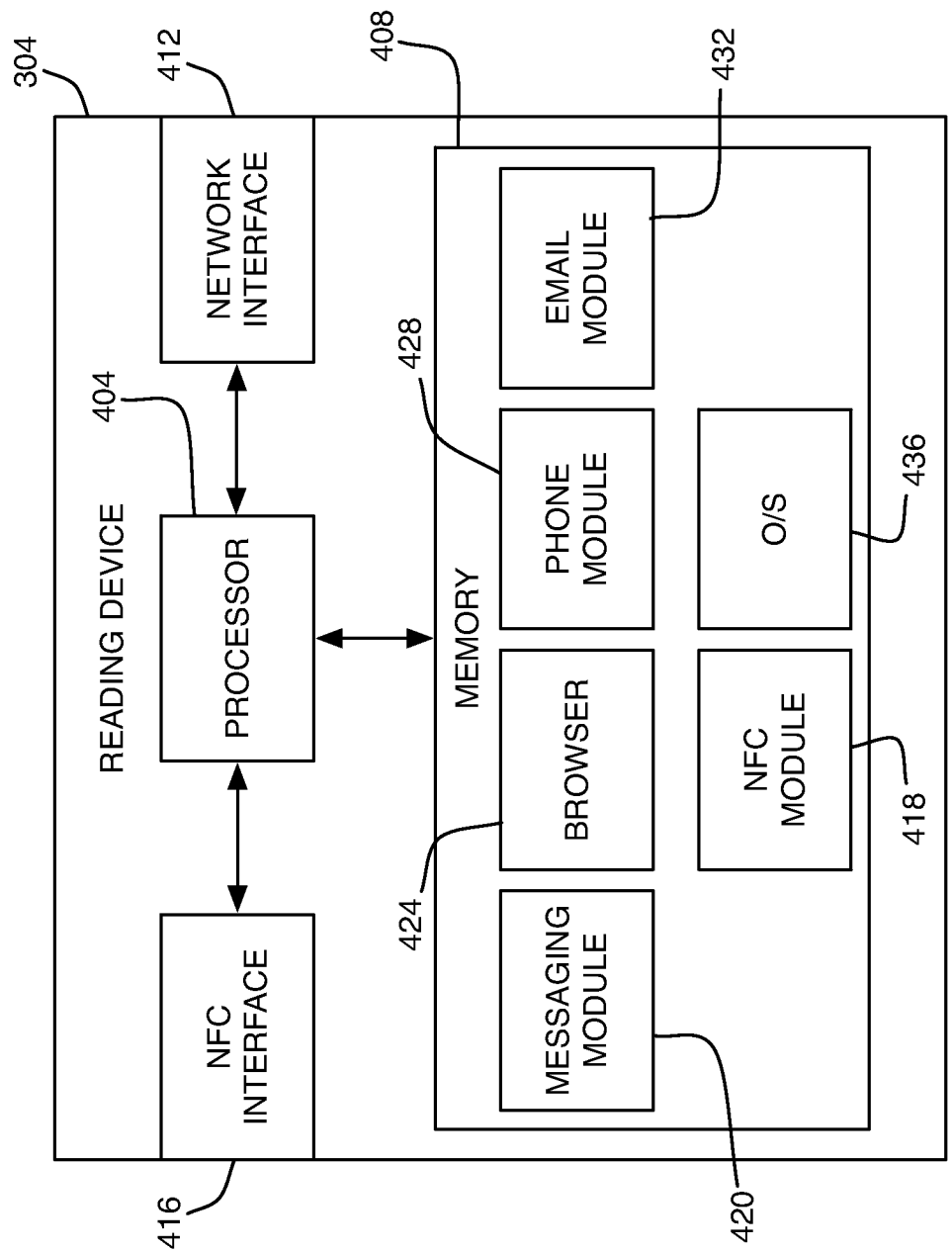
FIG. 4 is a block diagram depicting a reading device in accordance with embodiments of the present disclosure.

With reference now to FIG. 4, additional details of a reading device 304 will be described in accordance with embodiments of the present disclosure. The reading device 304 may correspond to a mobile communication device such as a cellular phone, smart phone, tablet, laptop, or any other device that is NFC-enabled, Bluetooth-enabled, or otherwise configured to communicate via one or more proximity-based RF communication protocols or non-proximity-based RF communication protocols such as ZigBee, for example. The reading device 304 is depicted as comprising a processor 404, memory 408, an NFC interface 416, and a network interface 412. In some embodiments, the processor 404 may correspond to a plurality of processors, each configured to perform certain operations for the reading device 304. As an example, the reading device 304 may have dedicated processors for its NFC functions and other functions. In some embodiments, the components of the reading device 304 may be connected together via a data bus or similar architecture. Thus, although the components are depicted as being connected via the central processor 404, such an arrangement of components is not required.

The processor 404 may correspond to a microprocessor, Central Processing Unit (CPU), collection of processors or CPUs, or the like. In some embodiments, the processor 404 may be configured to execute instructions stored in memory 408, thereby providing functionality to the reading device 304.

The memory 408 may comprise a number of modules or instruction sets (e.g., applications, drivers, etc.) stored therein. In some embodiments, the memory 408 may include volatile and/or non-volatile memory. As some non-limiting examples, the memory 408 may include an NFC module 418, a messaging module 420, a browser 424, a phone module 428, an email module 432, and an Operating System (O/S) 436.

The NFC module 418 may comprise instructions that, when executed by the processor 404, enable the NFC functionality of the reading device 304. For instance, the NFC module 418 may be responsible for causing the reading device 304 to operate in a card emulation mode, a read/write mode, and/or a peer-to-peer mode. The NFC module 418 may also correspond to a specific portion of memory where sensitive data normally communicated via NFC (e.g., key(s), encryption algorithms, PINs, credit card numbers, payment authorization information, other transaction data, etc.) is securely stored on the reading device 304. As an example, the NFC module 418 may include a secure element such as a SIM card or an embedded secure element where NFC data is stored in an encryption fashion. Thus, the NFC module 418 may correspond to specific memory or memory locations in addition to providing the executable instructions for the processor 404. Alternatively or additionally, the NFC module 418 may be replaced with or supplemented with a Bluetooth module that enables the reading device 304 to communicate with other devices (e.g., the smart tag 308) via Bluetooth. It should be appreciated that the reading device 304 may be equipped for both Bluetooth and NFC communications. In some embodiments, the Bluetooth communications may occur via the network interface 412 or the NFC interface 416.

When executed, the NFC module 418 or Bluetooth module may cause the processor 404 to exchange information with other devices according to known NFC or Bluetooth protocols via the NFC interface 416 or network interface 412. Where NFC is employed, the NFC interface 416 may include a coil or antenna that creates an inductive coupling with other RF-enabled devices. The size of the NFC interface 416 may depend upon the overall size of the reading device 304 as well as other antennas (e.g., network interface 412) contained within the reading device 304.

The other phone functionality of the reading device 304 may be provided by the other modules 420, 524, 528, 532 and O/S 436 stored in memory 408. As examples, the O/S 436 may correspond to a mobile operating system specifically designed for smart phones or the like. Non-limiting examples of an O/S 436 include Android®, iOS®, BlackberryOS®, Windows®, Windows Mobile®, and the like. The O/S 436 may be responsible for providing the basic functionality of the phone (e.g., controlling user input and output functions, microphone functions, coordinating drivers, etc.) in addition to coordinating operations of the applications and other modules stored in memory 408.

The messaging module 420 may correspond to an application that enables the reading device 304 to communication SMS, MMS, and other messages via a cellular communication network. Alternatively or additionally, the messaging module 420 may utilize social media channels.

The browser 424 may provide the reading device 304 with the ability to browse the Internet, for example. The browser 424, in some embodiments, corresponds to an application that enables the reading device 304 to exchange information with servers and other data providers over a communication network using known Internet Protocols (e.g., HTTP, HTML, XML, etc.). Non-limiting examples of browsers 424 include Internet Explorer®, Safari®, Google Chrome®, mobile versions thereof, etc. In some embodiments, the browser 424 corresponds to at least a portion of the authentication service interface 336.

The phone module 428 may provide the reading device 304 with the ability to initiate and respond to calls (e.g., voice calls, video calls, multi-media collaborations, etc.). The phone module 428 may also enable a user to perform advanced communication functions such as accessing voicemail, establishing conference calls, etc.

The email module 432 may provide the reading device 304 with the ability to exchange electronic mail messages with other devices over a communication network. As examples, the email module 432 may specifically support email communications. It should also be appreciated that the email module 432 may be combined with the messaging module 420 to support other types of communications such as social media communications (e.g., Facebook®, Twitter®, etc.), Short Message Service (SMS) messaging, Multimedia Messaging Services (MMS), and so on.

Communications between the reading device 304 and a broader communication network may be facilitated by the network interface 412, which may actually include several interfaces to different networks or network types. For instance, the network interface 412 may comprise a cellular network interface that enables the reading device 304 to interact with a cellular network, which is usually provided by a Mobile Network Operator (MNO). Alternatively or additionally, the network interface 412 may comprise a Bluetooth interface, Infrared interface, etc. The network interface 412 may alternatively or additionally include an 802.11N interface (e.g., Wi-Fi interface), a Universal Serial Bus (USB) port, or any other wired or wireless interface to the communication bus of the reading device 304.

Figure 5:
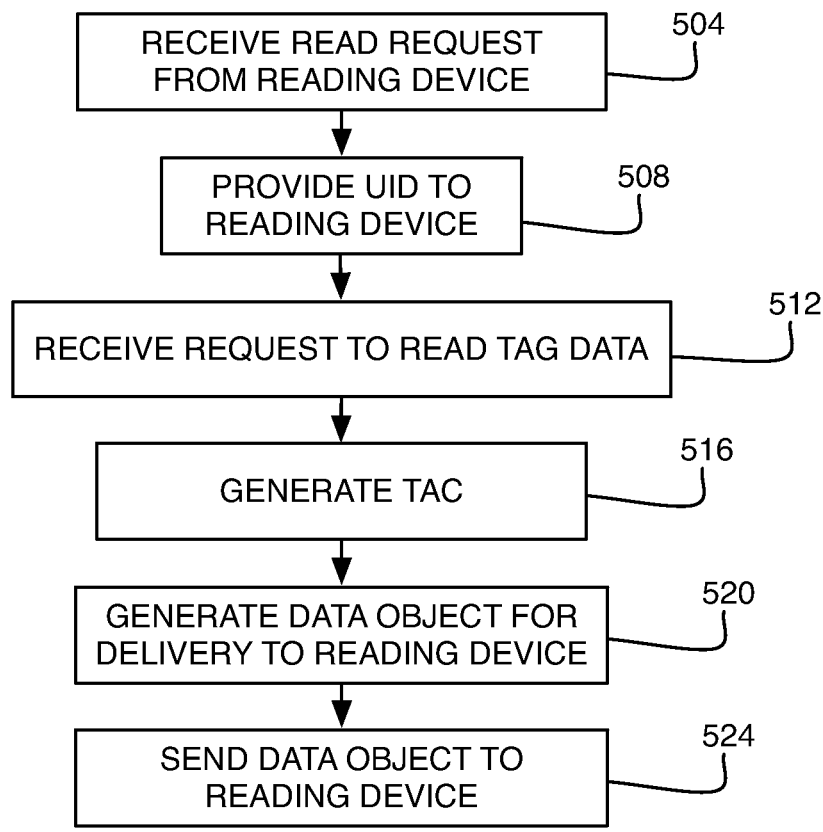
FIG. 5 is a flow diagram depicting a method of operating a smart tag in accordance with embodiments of the present disclosure.

With reference now to FIG. 5, a method of responding to a read request with a smart tag 308 will be described in accordance with embodiments of the present disclosure. The method begins when a smart tag 308 receives a read request from a reading device 304 (step 504). The read request may be similar or identical to the request received in step S301. Upon receiving this first read request, the smart tag 308 may provide the reading device with its TAGID 312 (step 508).

Thereafter, the reading device 304 may issue a second read request corresponding to a request for tag data 320 from the smart tag 308 (step 512). In response to the second read request, the smart tag 308 may invoke its TAC module 324 and cryptographic engine 328 to generate a TAC that is unique to the read request just received from the reading device (step 516). In some embodiments, the TAC is generated based on the K value and current C values maintained by the TAC module 324. The generation of the TAC in this step may be similar or identical to process step S304.

After the TAC for the interaction has been generated by the cryptographic engine 328, the NFC applet 316 of the smart tag 308 generates a data object 124 for transmission to the reading device 304 (step 520). In some embodiments, the data object 124 comprises the tag data and the TAC. Even more specifically, the data object 124 may include the tag data 320 and a data signature that include a signature value as well as a unique certificate URL. The unique certificate URL may include the newly-generated TAC, the TAGID 312, and a certificate URL that includes the address of a server operated by the authentication service 340. In some embodiments, the data signature can be used by the reading device 304 to validate the tag data 320.

The data object 124 is then transmitted to the reading device 304 (step 524). In some embodiments, the data object 124 is transmitted via one or more NDEF messages or NDEF records (e.g., via an inductive coupling between the smart tag 308 and reading device 304). Alternatively or additionally, the data object 124 may be transmitted via a Bluetooth connection established between the reading device 304 and smart tag 308. This particular step may be similar to process step S305.

Once the data object 124 has been transmitted by the smart tag 308 or after the TAC has been generated, the smart tag 308 may also be configured to update its counter value C and wait for the next read request or detection of another reading device 304. In some embodiments, updating the counter value C may comprise incrementing the current value C by a predetermined amount to a next counter value C plus a predetermined increment amount.

Figure 6:
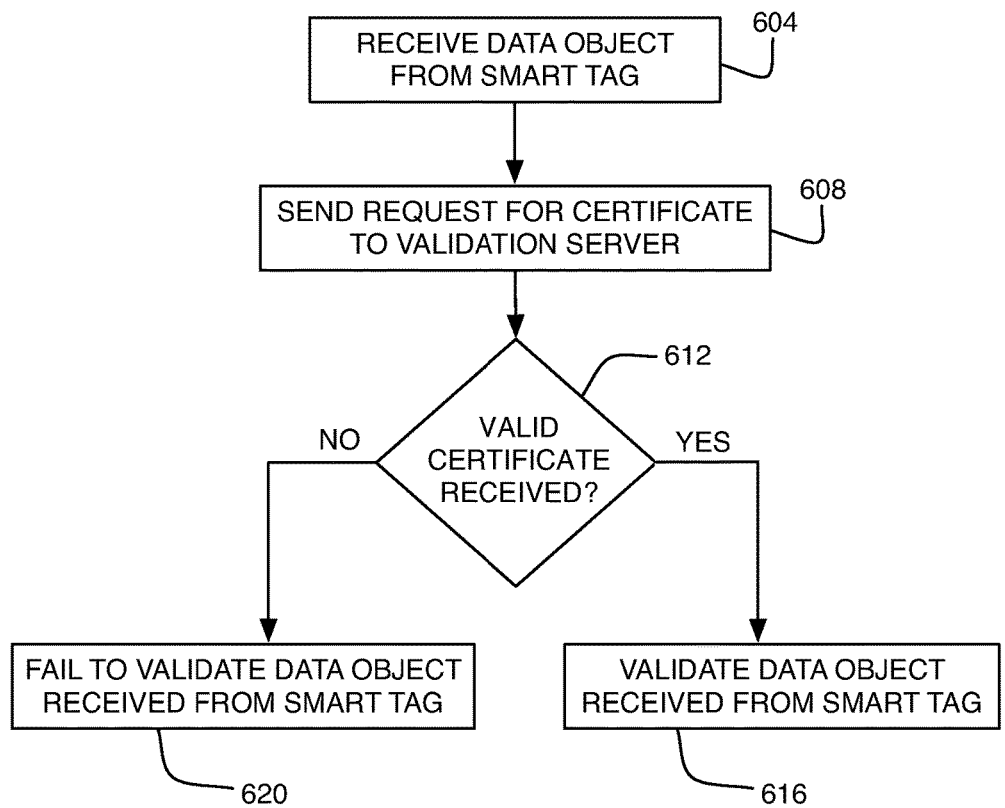
FIG. 6 is a flow diagram depicting an authentication method in accordance with embodiments of the present disclosure.

With reference now to FIG. 6, a method of authenticating a smart tag 308 will be described in accordance with embodiments of the present disclosure. The method begins with the reading device 304 receiving a data object 124 from a smart tag 308 (step 604). The data object 124 may include tag data 320 and response-specific data 128, possibly in the form of a data signature.

The reading device 304 may separate the response-specific data 128 from the tag data 320 and further extract a certificate URL from the response-specific data 128. The reading device 304 may use the information from the certificate URL to transmit a request for a signature certificate to the authentication service (step 608). This step may be similar or identical to step S307. In some embodiments, if the smart tag 308 is valid and operating properly, the certificate URL may be a unique certificate URL containing a URL of the authentication service 340, the TAGID 312, and the TAC recently generated by the smart tag 308. If the received certificate URL corresponds to a replay of a previously-generated response, then the certificate URL will contain an old or invalid TAC and/or the TAC may not be appropriately associated with the correct TAGID 312.

Accordingly, the reading device 304 will wait for the authentication service 340 to analyze the certificate URL and the TAC contained therein. If the authentication service 340 determines that the certificate request comes from a valid and known smart tag 308 and is not a replay, then the authentication service 340 will issue a valid signed certificate for the reading device 304. On the other hand, if the authentication service 340 fails to validate the certificate request (e.g., due to the TAC being improper, due to the TAC not be properly associated with the correct TAGID, etc.), then the authentication service 340 can return either an expired or incorrect certificate (e.g., a certificate having an expired or wrong public key).

The method continues with the reading device 304 determining whether a valid signature certificate has been received back from the authentication service 340 (step 612). In particular, if no signature certificate is received of if an expired or invalid signature certificate is received, then the reading device 304 will fail to validate the data object 124 received in step 604 and the reading device 304 may further determine that the smart tag 308 is not authenticated (step 620). Alternatively, if a valid signature certificate is received, the reading device 304 can validate the signature that was received as part of the response-specific data 128 and further validate the entire data object 124, including the tag data 320 (step 616). This means that the reading device 304 can trust the data object 124 received from the smart tag 308 and the reading device 304 may further perform an operation based on the contents of the tag data 320. For instance, the reading device 304 may navigate its browser to a server referenced in the tag data 320. Alternatively or additionally, the reading device 304 may execute one or more instructions contained within the tag data 320. All of these additional steps can be performed because the reading device 304 is able to authenticate and trust the smart tag 308 by virtue of receiving a valid signature certificate from the authentication service 340.

It is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A smart tag, comprising:
   data storage configured to store tag data, an address of an authentication service, a cryptographic key, and a changeable data part that is initially stored in the data storage with an initial value and is changed to a new and non-repeated value after each use of the smart tag;
   a Tag Authentication Cryptogram (TAC) module that invokes a cryptographic engine to utilize the cryptographic key and the changeable data part to generate a unique TAC in response to receiving a read request from a reading device; and
   a communication interface that enables the TAC module to transmit the unique TAC along with the tag data and the address of the authentication service to the reading device, wherein the reading device is enabled to validate the smart tag by requesting a signature certificate for the unique TAC from the authentication service prior to the reading device executing one or more instructions contained in the tag data, wherein the authentication service receives the unique TAC from the reading device, validates the unique TAC and subsequently issues the signature certificate to the reading device.

2. The smart tag of claim 1, wherein the data storage includes a secure element that stores at least one of the tag data, the address of the authentication service, and the cryptographic key in an encrypted fashion.

3. The smart tag of claim 1, wherein the address of the authentication service comprises a Universal Resource Locator (URL) and wherein the unique TAC is appended to the URL when transmitted to the reading device.

4. The smart tag of claim 3, wherein the unique TAC and URL are used to request the signature certificate from the authentication service, wherein if the signature certificate is valid and received at the reading device, the smart tag is validated to the reading device.

5. The smart tag of claim 1, wherein the data storage is configured to also store a TagID and wherein this TagID is transmitted by the TAC module along with the TAC.

6. The smart tag of claim 1, wherein the communication interface comprises a Near-Field Communications (NFC) interface.

7. The smart tag of claim 1, wherein the communication interface comprises a Bluetooth interface.

8. The smart tag of claim 1, wherein the cryptographic key comprises a symmetric cryptographic key.

9. The smart tag of claim 1, wherein the tag data comprises at least one of a phone number, email address, and Universal Resource Locator (URL).

10. A method of operating a smart tag, comprising:
    receiving, at the smart tag, a read request from a reading device;
    in response to receiving the read request, generating, at the smart tag, a data object that includes tag data and response-specific data, the response-specific data including a signature value, a unique certificate Universal Resource Locator (URL), and a changeable data part that is initially stored in the smart tag with an initial value and is changed to a new and non-repeated value after each use of the smart tag; and
    transmitting the data object from the smart tag to the reading device via a proximity-based Radio Frequency (RF) protocol, wherein the reading device validates the smart tag by requesting a signature certificate for the response-specific data from an authentication service prior to the reading device executing one or more instructions contained in the tag data, wherein the authentication service receives the response-specific data from the reading device, validates the response-specific data and subsequently issues the signature certificate to the reading device.

11. The method of claim 10, wherein the unique certificate URL comprises a substantially unique Tag Authentication Cryptogram (TAC) and a Tag Identifier (TAGID) incorporated therein.

12. The method of claim 11, wherein the unique certificate URL is transmitted to the reading device with one or more delimiters separating the tag data, the TAGID, and the TAC.

13. The method of claim 11, wherein the unique certificate URL and the TAC incorporated therein are used to obtain a valid signature certificate from the authentication service and wherein the reading device conditions execution of the one or more instructions contained in the tag data upon receiving the valid signature certificate.

14. The method of claim 10, wherein the proximity-based RF protocol comprise at least one of a Near-Field Communications (NFC) protocol, an Ultra-High Frequency (UHF) protocol, a High Frequency (HF) protocol, and a Bluetooth protocol.

15. A method of authenticating a smart tag, comprising:
    receiving, at an authentication service from a reading device, a request for a signature certificate, wherein the request for the signature certificate includes a Tag Authentication Cryptogram (TAC) generated by the smart tag during an interaction between the smart tag and the reading device, wherein the TAC is generated using a changeable data part that is initially stored in the smart tag with an initial value and is changed to a new and non-repeated value after each use of the smart tag;
    analyzing the TAC to determine whether the TAC is unique and generated by a known and valid smart tag;
    based on the analysis of the TAC, determining that the TAC is unique and generated by the known and valid smart tag;
    in response to determining that the TAC is unique and generated by the known and valid smart tag, generating a valid signature certificate; and
    transmitting the valid signature certificate to the reading device, wherein the reading device conditions execution of instructions contained in tag data exchanged between the smart tag and reading device during the interaction upon receiving the valid signature certificate.

* * * * *